United States Patent [19]

Gleason

[11] 4,028,077
[45] June 7, 1977

[54] MIST ELIMINATOR

[75] Inventor: Robert Joseph Gleason, Edison, N.J.

[73] Assignee: Research-Cottrel, Inc., Bound Brook, N.J.

[22] Filed: Jan. 15, 1976

[21] Appl. No.: 649,234

[52] U.S. Cl. .................................. 55/442; 55/257
[51] Int. Cl.² ......................................... B01D 45/00
[58] Field of Search ................... 55/440, 441–446, 55/257 OV

[56] References Cited

UNITED STATES PATENTS

| | | | |
|---|---|---|---|
| 2,583,171 | 1/1952 | Green et al. | 55/444 |
| 3,757,498 | 9/1973 | Hurlbut et al. | 55/440 |
| 3,830,044 | 8/1974 | Wetteborn | 55/440 |
| 3,870,487 | 3/1975 | Hurlbut et al. | 55/440 |

Primary Examiner—Bernard Nozick
Attorney, Agent, or Firm—Harold L. Stowell

[57] ABSTRACT

An impingement or rebound separator for removing mist from a flow of gas consists of a first series of spaced eliminator blades each having at least one of its ends connected to an end plate with the transverse axis of each blade sloping at an angle of about 20° to about 30° to the direction of flow of gas and a second series of spaced eliminator blades each having at least one of its ends connected to an end plate and with the transverse axis of each blade sloping at an angle of about 20° to about 30° to the direction of flow of gas but pitched in the opposite direction to the pitch of the first series of blades. The first and second series of blades defining a separator unit having a plurality of zig-zag or chevron shaped gas flow channels with the longitudinal axes of the blades tilted at an angle of about 30° to about 45° to the direction of flow of the gas stream so that liquid removed from the gas stream will be channeled downstream along the edges of each blade to collection means which may comprise the lower end plates.

2 Claims, 5 Drawing Figures

MIST ELIMINATOR

BACKGROUND OF THE INVENTION

1. Field of the Invention

This invention relates to means for separating drops of liquid or mist entrained in a flow of gas by an improved rebound-type contacting means and particularly the invention relates to such separators having a plurality of rebound walls so arranged as to define a plurality of zig-zag or chevron shaped gas flow passages with the longitudinal axes of the walls tilted at an angle of about 45° to the direction of gas flow.

2. Description of the Prior Art

Scrubbing of boiler flue gases with slurries of limestone ($CaCO_3$) or calcined limestone products, lime and hydrate lime is a simple method to remove the sulfur dioxide from the combustion gases. Absorbers with sprays, packing or fludized beds generate liquid droplets containing solid matter of limestone or hydrated lime, calcium sulfite hydrates and calcium sulfate hydrates which must be removed from the gas stream.

Impingement type demisters have been effective in removing the liquid droplets from the flue gas stream before it is discharged to the stack and subsequent atmosphere. However, slurry droplets impinging on the demister surfaces have a natural tendency to dewater at the demister blades leaving a mud-like deposit as a residue. As more and more droplets deposit solids within the demister, it eventually becomes plugged with sludge and recrystallized sludge.

One form of mist eliminators employed in such scrubbers have separating or rebound walls which are positioned in respect to each other such that they define a plurality of zig-zag openings through which gas to be demisted passes. When a liquid-containing gas travels through such a tortuous path, the liquid droplets impinge on the surface of the separating walls and tend to stay thereon while the gas streams continue to flow through the chevron shaped passages.

The effectiveness of such mist eliminators is dependent upon many factors such as the gas velocity, the mass of the droplets, the viscosity of the gas and the geometric shape of the separating gas flow channels. Typical mist eliminators are specially suited for a particular separating task based on a known gas velocity and viscosity together with a knowledge of the size of the smallest drop which must be removed by the eliminator. It has been found that, where the gas stream contains suspended solid particles or the liquid droplets have substances dissolved therein, deposits occur on the eliminator blades which deposits alter the shape of the air flow channels, reduce the efficiency of the demisters and the operating reliability thereof. Once the deposits have started to form, the buildup of the deposition is accelerated and finally many of the separating passages become completely clogged.

It is therefore a primary object of this invention to provide an improved impingement-type mist separator having characteristics which eliminate or materially reduce the formation and buildup of deposits in the air flow channels thereof.

SUMMARY OF THE INVENTION

The invention consists generally of an improved impingement or rebound separator for removing mist from a flow of gas consisting of a first series of spaced eliminator blades each having at least one of its ends connected to an end plate with the transverse axis of each blade sloping at an angle of from about 20° to about 30° to the direction of flow of gas and a second series of spaced eliminator blades each having at least one of its ends connected to an end plate and with the transverse axis of each blade sloping at an angle of from about 20° to about 30° to the direction of flow of gas but pitched in the opposite direction to the pitch of the first series of blades. The first and second series of blades defining a separator unit having a plurality of zig-zag or chevron shaped gas flow channels with the longitudinal axes of the blades tilted at an angle of from about 30° to about 45° to the direction of flow of the gas stream so that liquid removed from the gas stream will be channeled downstream along the edges of each blade to collection means which may comprise the lower end plates.

The invention as summarized herein allows the operation of alkali flue gas desulfurization systems at higher velocities and improves the washing and flushing of the slurry droplets from the demister blades. Water flushing of the demister is also improved by allowing the demister droplets and the flushing water to flow downstream in the direction of the lower demister support. Water droplets and slurry droplets run downstream along the surface until they develop into stream. These streams, by mechanical flow and dilution, flush away slurry droplets that are sticking to the surface of the demister blades.

In addition to the improved cleaning action, the reentrainment of droplets falling from the blades is substantially eliminated as all of the fluids trapped by the demister flow to the bottom edge of the demister, the liquid thus accumulating flows from the demister as streams and large liquid droplets. Reentrainment of the streams and large droplets is difficult. Small drops may reentrain as before but the recycle of this smaller portion of dilute slurry has little or no effect on the operation or plugging of the demister.

DESCRIPTION OF PREFERRED EMBODIMENT

Figure 1:
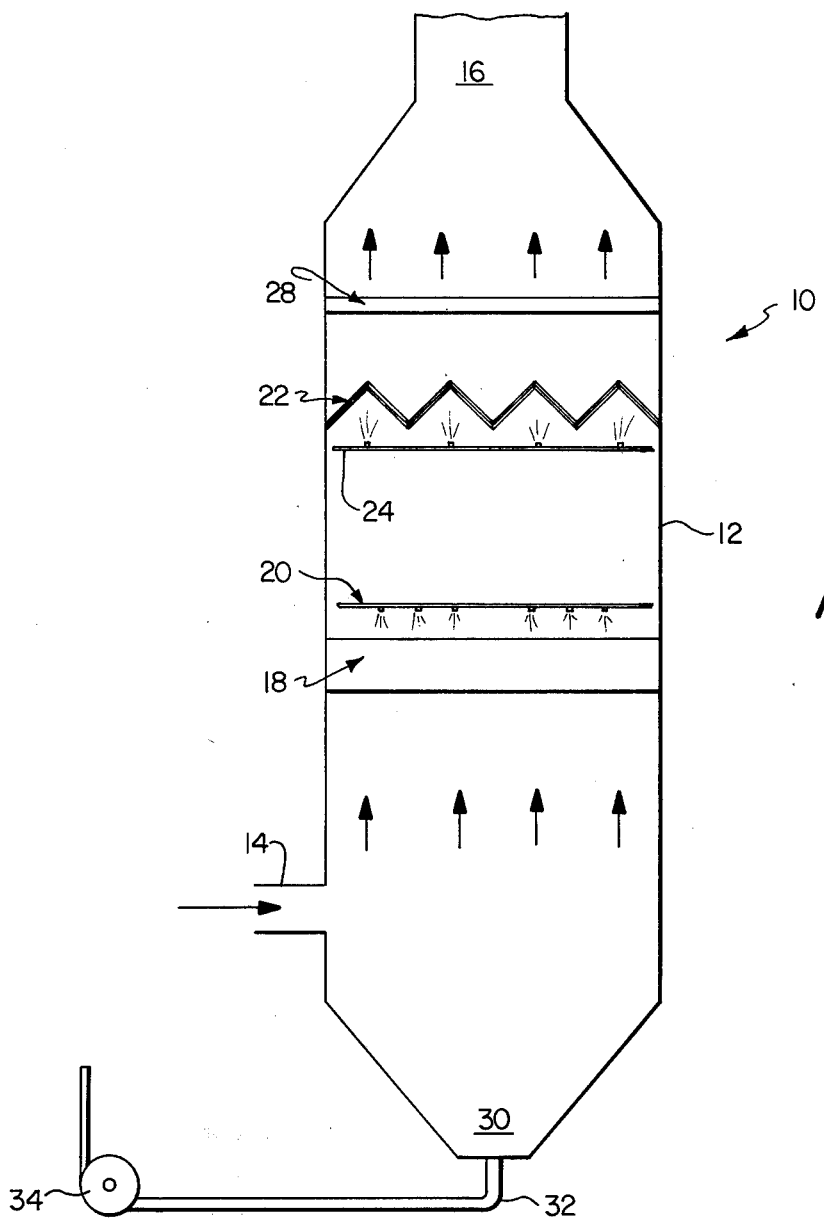
FIG. 1 is a vertical sectional view through a gas scrubbing apparatus containing the improved mist eliminator of the present invention.

Referring to FIG. 1, 10 generally designates a gas scrubbing tower having a shell 12 for cleaning dirty gases by contacting the dirty gas stream with a scrubbing liquid, which may comprise slurries of limestone, or calcined limestone products or lime and hydrated lime adapted to remove sulfur dioxide from combustion gases. The combustion gases enter the tower 10 via inlet 14 and the cleaned and scrubbed gases leave the tower at upper gas outlet 16.

Above the gas inlet 14 is an absorber section 18 which absorber section may comprise packing, fill and the like of conventional design forming no part of the present invention.

Above the absorber section 18 are a battery of sprays generally designated 20 which distribute the scrubbing slurry across the absorber fill so that gases passing upwardly from the inlet 14 to the outlet 16 are brought into intimate contact with the slurry. Gas flowing through the absorber and the slurry distributing spray means 20 entrain droplets of the spray which must be removed before the gas stream issues from the outlet 16 to a stack or the like.

In the illustrated form of the invention, the droplets suspended in the flowing gas stream are removed in a first demisting section generally designated 22, which demisting section comprises the invention claimed herein. Below the demisting section 22 is a battery of spray means 24 which assist in maintaining the impact or channel forming surfaces of the demister clean.

The spray section 24 may be connected to the supply of the scrubbing recycle or clarified supernatant or the spray means 24 may be connected to a source of clean washing liquid. Above the demister 22 is a final demister 28 which may be of any conventional form or, if deemed necessary, may be similar in construction to the demister section 22 to be described in detail hereinafter.

The scrubbing slurry from the battery of the spray 20, after passing through the absorber section 18, is collected at the lower end 30 of the tower 12 and conveyed therefrom via conduit 32, pump 34 to suitable storage and/or treatment means (not shown) for redistribution to the battery of sprays 20 or 24 as the case may be.

Figure 2:
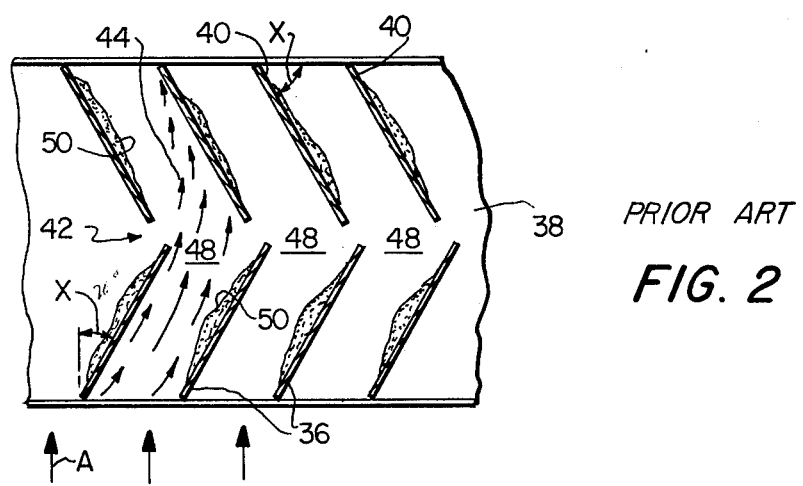
FIG. 2 is a sectional view through a chevron type mist eliminator of the prior art.

Referring now to FIG. 2 of the drawing, a conventional impact type scrubber is illustrated comprising a first series of spaced eliminator blades 36 each having its ends connected to end plates 38, only one of which is shown in FIG. 2, with the transverse axis of each blade sloping at an angle of about 20° to the direction of flow of gas as illustrated by the flow arrows and reference X. The assembly includes a second series of space eliminator blades 40 each having its ends connected to the end plates and with the transverse axis of each blade sloping at an angle of 20° to the direction of flow of gas but pitched in the opposite direction to the pitch of the first of the series of blades 36.

Figure 3:
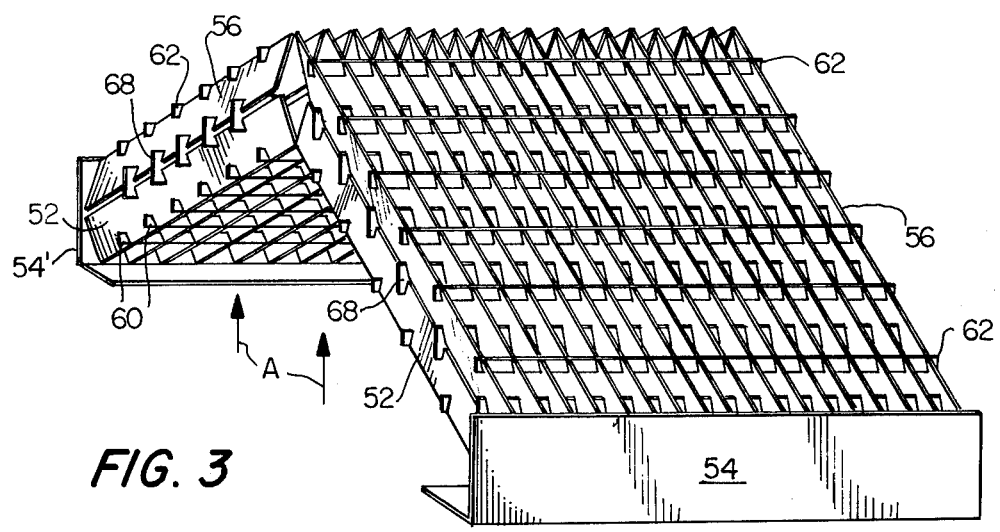
FIG. 3 is a perspective view of a form of the improved mist eliminator of the invention.
Figure 4:
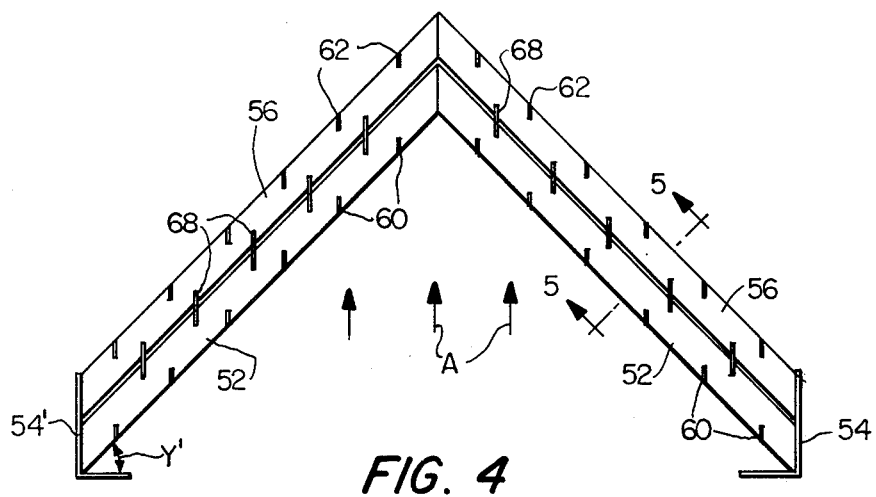
FIG. 4 is an end view of the structure shown in FIG. 3.
Figure 5:
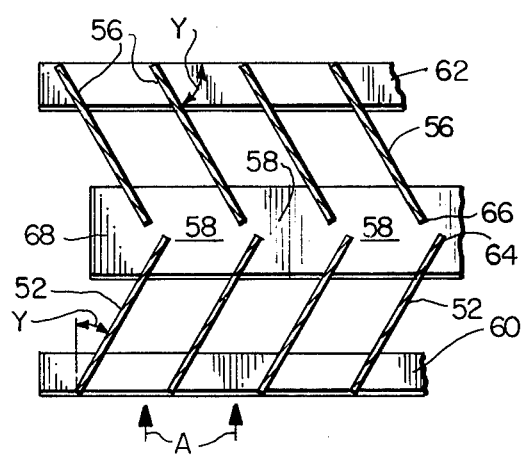
FIG. 5 is a section on line 5—5 of FIG. 4.

The height of the blades 36 and 40 is substantially the same and being so selected in respect to the height of the end plates 38 that there is a space between the inner edges of the blades 36 and 40 as shown at 42, thus each series of blades 36 and 40 together with the end plates define a plurality of zig-zag passages 48 for the flow of gas therethrough as illustrated by the directional arrows 44. It will be noted from the drawing that buildup of deposits occurs adjacent each low pressure zone 50 of each passage. It is such buildup of deposits that the present invention is intended to eliminate or materially reduce. Referring now to FIGS. 3, 4 and 5 there is shown a preferred embodiment of the impact-type mist eliminator of the present invention. The eliminator includes a first series of spaced eliminator blades 52 having the lower ends thereof connected to end plates 54 and 54' for the right and left hand series of eliminator blades 52. The eliminator blades are pitched at an angle of from about 20° to about 30° and preferably about 30° to the direction of air flow indicated by directional arrows A and reference character Y in FIGS. 4 and 5.

The assembly also includes a second series of spaced eliminator blades 56 having the lower ends secured to the end plates 54 and 54' as the case may be. The blades 56 are also mounted such that the angle Y, FIG. 5, of the blades in respect to the direction of air flow is the same as that for blades 52 but pitched in the opposite direction and the blades 56 are positioned such as to define with the first series of blades 52 a plurality of zig-zag flow paths 58 for the gas stream passing therethrough.

As in the case of the prior art, the height of the blades 52 and 56 in respect to the spacing between each of the series of blades is such that the inner edges are not in contact with each other. In order to provide additional support for the series of blades 52 and 56, the assembly includes a plurality of stiffening webs or ribs 60 which are secured along the upstream edges of blades 52 and a similar series of stiffening webs or ribs 62 are mounted along the downstream edges of the blades 56 forming the second series. Further, the trailing edges 64 of blades 52 and the leading edges 66 of blades 56 are connected at spaced intervals by stiffening webs or ribs 68. By employing the stiffening ribs 60, 62 and 68, the blades 52 and 56 may be constructed of light gauge material thereby reducing the amount of space occupied by the blades which, as will be appreciated by those skilled in the art, minimizes the pressure drop across the eliminators.

The units are mounted so that the longitudinal axis of the blades of each assembly, consisting of the two series of blades and stiffeners, is at an angle of from about 30° to about 45° and preferably at an angle of about 45° to the direction of gas flow as shown at Y'. Thus, the downstream edges of the blades 52 and 56 will readily direct collected droplets to the end plates 54 and 54' with a minimum of resuspension and a minimum of emission loss thereby materially improving the efficiency of the mist eliminator and at the same time eliminating the buildup of deposits as hereinbefore discussed in reference to FIG. 2 of the drawing.

As shown in FIGS. 1, 3, 4 and 5, a plurality of units are assembled in the illustrated V-shaped configuration. However, it will be appreciated that depending upon the size of the installation only one-half of the units illustrated, for example, in FIG. 4 could be used or one entire unit, as illustrated in FIG. 4, could replace the four units shown in FIG. 1 without departing from the scope of the present invention.

The blades and stiffeners comprising the impingement type mist separator may be constructed from many different materials and, for illustration purposes only, materials of construction may include polystyrene, polypropylene, p.v.c., a.b.s., and stainless steel depending upon the working temperature at which the material is to be used and the requirements for corrosion resistance.

Tests have demonstrated that by constructing the improved impingement type demister as disclosed herein resulted in an unexpected improvement in allowing operation of scrubber system at higher gas velocities. In prior art impingement demisters normally severe plugging developed during operation at gas velocities of 7-8.5 feet per second whereas with the improved demister frontal velocities of 7-8.5 feet per second result in an overall tower velocities of 10-12 feet per second. Further, mounting the demister at the 45° angle permits a 41% greater processing area than a conventional demister positioned in a horizontal position. At angles with less pitch, the gas velocities achievable without droplet reentrainment is less when the superficial velocity is maintained at the same value with respect to the pitched demister.

It is believed that the improved results of being able to operate the scrubber at greater gas velocities is brought about by the fact that water droplets carried by the gas stream and from water flushing quickly run along the sloping surfaces where they soon develop into flowing streams. These streams, by mechanical flow and dilution, flush away slurry droplets that are sticking to the surfaces of the demister blades.

I claim:

1. In a gas scrubbing tower having a generally vertical gas flow therethrough an impingement or rebound separator, means mounted across the tower in the path of the gas flow for removing mist from the flow of gas comprising a first series of spaced apart eliminator blades, at least one end plate, each of said first of the series of eliminator blades having at least one of its ends connected to said at least one end plate with the transverse axis of each said blade sloping at an angle of from about 20° to about 30° to the direction of flow of the gas through the tower and a second series of spaced apart eliminator blades each having at least one of its ends connected to said end plate with a transverse axis of each eliminator blade sloping at an angle of from about 20° to about 30° to the direction of flow of gas through the tower but pitched in an opposite direction to the pitch of the first series of eliminator blades, the first and second series of eliminator blades defining a separator unit having a plurality of gas flow channels therebetween with the longitudinal axis of the blades of the separator unit tilted at an angle of from about 30° to about 45° to the direction of flow of gas through the tower so that liquid removed from the gas stream will be channeled along the edges of the first and second series of eliminator blades to collection means which may comprise the at least one end plate and wherein a pair of the said impingement separators are assembled in a V-type configuration with the apex of the V being positioned downstream with respect to the gas flow through the tower.

2. The invention defined in claim 1 including a plurality of stiffening webs engaging the downstream portion of each of the first in series of eliminator blades and running normal to the longitudinal direction of said blades, further stiffening webs engaging the upstream edges of the second in series of blades and running normal to the longitudinal axis of each said blades; and further strengthening webs engaging at least the upstream edge of each of the second series of blades and extending generally normal to the longitudinal axis of each of the blades of the first and second series.

* * * * *